United States Patent Office 3,707,476
Patented Dec. 26, 1972

3,707,476
3-ALKANOL DERIVATIVES OF 4H[1]BENZO-
PYRANO[3,4-d]ISOXAZOLES
Jules Freedman, Thiensville, Wis., assignor to Colgate-
Palmolive Company, New York, N.Y.
No Drawing. Continuation-in-part of application Ser. No.
670,775, Sept. 26, 1970. This application Oct. 30, 1970,
Ser. No. 85,799
Int. Cl. C07d 85/22
U.S. Cl. 260—307 H    5 Claims

ABSTRACT OF THE DISCLOSURE

The compounds are derivatives of 3-alkanol-4H[1]benzopyrano[3,4-d]isoxazoles useful in the preparation of wood preservatives, mothproofing agents, pickling inhibitors and pharmaceutical agents. Representative of the compounds disclosed is 4H[1]benzopyrano[3,4 - d]isoxazole-3-methanol.

RELATED CASE

This application is a continuation-in-part of copending application Ser. No. 670,775 filed September 26, 1970, now U.S. Pat. No. 3,553,229.

DETAILED DESCRIPTION

The novel compounds of the present invention have the following formula

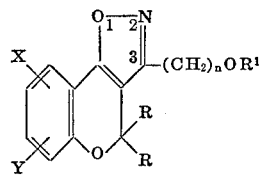

in which X and Y are the same or different members selected from hydrogen, halo such as chloro, bromo or fluoro, hydroxy, lower alkyl of 1 to 4 carbon atoms, nitro, methylenedioxy, lower alkoxy such as methoxy, ethoxy or propoxy and trifluoromethyl, $n$ is 1 to 4, R is hydrogen, lower alkyl of 1 to 4 carbon atoms, phenyl or a nuclear substituted phenyl such as o-chlorophenyl and p-methoxyphenyl, $R_1$ is hydrogen, an acyl such as acetyl, trifluoroacetyl, propionyl, butyryl and benzoyl or

in which Am is
(a)

in which $R_2$ and $R_3$ are the same or different and are selected from hydrogen, lower alkyl of 1 to 4 carbon atoms such as methyl, ethyl, isopropyl or butyl, amino-lower alkyl, hydroxy-lower alkyl such as hydroxy ethyl, alkoxy alkyl, alkenyl of 3 to 6 carbon atoms such as allyl and hexenyl, an aralkyl of 7 to 13 carbon atoms such as benzyl, phenethyl and phenylisopropyl, a cycloalkyl of 3 to 7 carbon atoms such as cyclopropyl and cyclohexyl, a cycloalkyl-lower alkyl, in which the cycloalkyl contains 3 to 7 carbon atoms such as cyclohexyl-methyl and cyclopentyl-ethyl, an aryl, particularly phenyl, a nuclear substituted phenyl such as a halophenyl or a lower alkoxyphenyl, for example, p-chlorophenyl or p-methoxyphenyl and a heterocyclic group such as pyridyl, piperidyl, furyl, thienyl, pyrryl and pyrrolidyl, (b) Groups in which $R_2$ and $R_3$ are joined together to form amino groups in which the nitrogen is part of a cyclic group such as morpholino, pyrrolidino, piperidino, 4-lower alkyl-1-piperazino such as 4-methyl-1-piperazino, N-phenyl-lower alkyl piperazino or N-hydroxy-lower alkyl piperazino and (c) A cyclic amine group bonded through a nuclear carbon to the alkylene chain, including such groups as N - lower alkyl - 3 or 4 - piperidyls such as N-methyl-3-piperidyl, N-ethyl-4-piperidyl and N-isopropyl-3-piperidyl, N-(di-lower alkyl amino-lower alkyl)-3 or 4-piperidyls such as N-(beta-dimethylaminopropyl)-4-piperidyl and N - (beta - diethylaminoethyl)-3-piperidyl, N-phenyl-lower alkyl-3 or 4-piperidyls such as N-benzyl-3-piperidyl, N-phenylethyl-4-piperidyl and N-phenylpropyl-3-piperidyl, 3-piperidyl and 4-piperidyl, 3-pyrrolidyl, N-lower alkyl-3-pyrrolidyls such as N-ethyl-3-pyrrolidyl, N-phenyl-lower alkyl - 3 - pyrrolidyls such as N-phenylethyl-3-pyrrolidyl.

The compounds of the present invention may be conveniently prepared employing as the basic starting material a 4-chromanone of the formula

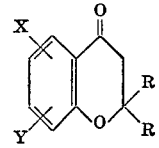

II in which R, X and Y are as previously defined.

The unsubstituted 4-chromanone is a known compound and the substituted compounds may be prepared as described in the literature [C. D. Hurd, et al., J. Am. Chem. Soc., 76, 5065 (1954) and S. Wawzonek, et al., J. Am. Chem. Som., 76, 1080 (1954)].

Representative of the 4-chromanones which may be employed in the described process are 4-chromanone,
6-methoxy-4-chromanone,
6-bromo-4-chromanone,
8-methyl-4-chromanone,
6-trifluoromethyl-4-chromanone,
2,2-dimethyl-4-chromanone,
6-chloro-4-chromanone,
2-phenyl-4-chromanone,
6-methyl-4-chromanone,
6,7-methylenedioxy-4-chromanone, and
6-chloro-2-phenyl-4-chromanone.

In the preferred method of preparation of the novel compounds, a 4-chromanone is treated with a lower alkyl oxalate such as ethyl oxalate, in the presence of a suitable base such as sodium amide, sodium methoxylate or sodium hydride in an anhydrous reaction medium, such as toluene or benzene, to form a lower alkyl 4-oxo-chroman-3-glyoxylate. The ring closure is then effected by treating the glyoxylate with hydroxylamine-hydrochloride in ethanol under reflux conditions thus forming the lower alkyl - 4H[1]benzopyrano[3,4 - d]isoxazole-3-carboxylate.

The described process may be illustrated as follows:

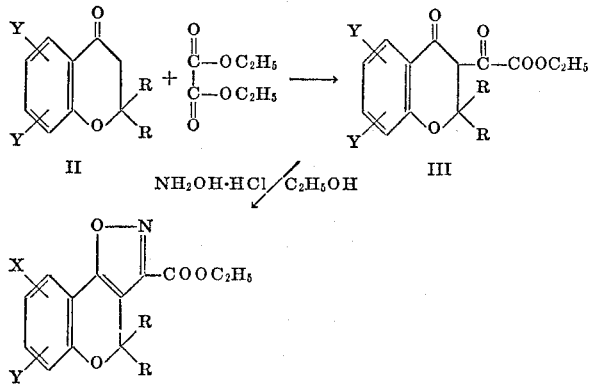

wherein R, X and Y are as previously defined and do not partake in or interfere with the reaction.

Representative of the compounds which may be prepared by the above processes are Ethyl 4-oxochroman-3-glyoxylate,
Ethyl 4H[1]benzopyrano[3,4-d]isoxazole-3-carboxylate,
Methyl 4H[1]benzopyrano[3,4-d]isoxazole-3-carboxylate,
Ethyl 6-chloro-4-oxochroman-3-glyoxylate,
Ethyl 8-chloro-4-oxochroman-3-glyoxylate,
Ethyl 6-chloro-4H[1]benzopyrano[3,4-d]isoxazole-3-carborylate,
Ethyl 8-chloro-4H[1]benzopyrano[3,4-d]isoxazole-3-carboxylate, and
Methyl 8-methoxy-4H[1]benzopyrano[3,4-d]isoxazole-3-carboxylate.

The lower alkyl 4H[1]benzopyrano[3,4-d]isoxazole-3-carboxylates may then be treated with a suitable chemical reducing agent, such as lithium aluminum hydride or phenyl lithium. When they are employed, the reaction is conveniently effected by intimately combining the reactants in an inert organic solvent such as anhydrous ether, dioxane or tetrahydrofuran. After the reaction is terminated, the desired alcohol is recovered by conventional techniques.

The described process may be illustrated as follows:

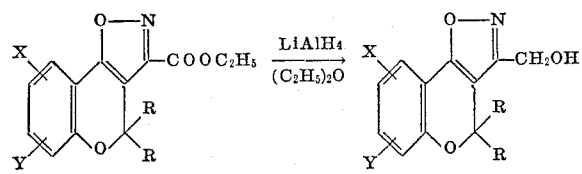

in which R, X and Y are as previously defined and represent groups that do not interfere with or partake in the reaction.

Representative of the alcohols which may be prepared by the above process are the following:

4H[1]benzopyrano[3,4-d]isoxazole-3-methanol,
8-chloro-4-H[1]benzopyrano[3,4-d]isoxazole-3-methanol,
6-methoxy-4H[1]benzopyrano[3,4-d]isoxazole-3-methanol, and
6-chloro-4H[1]benzopyrano[3,4-d]isoxazole-3-methanol, The alcohols in which $n$ is greater than 1 may be conveniently prepared by treating an alcohol in which $n$ is 1 with tosyl chloride to form the corresponding tosylate. The tosylate may then be treated with sodium cyanide to form the corresponding nitrile which upon hydrolysis yields the corresponding acid which in turn may be reduced to form the desired alcohol. The process, if desired, may be repeated to form the higher alcohols.

The above described alcohols serve as convenient starting materials for the preparation of the esters and carbamates. The esters may be prepared by treating the alcohol with an acylating agent such as acyl halide or acid anhydride.

The process may be illustrated as follows:

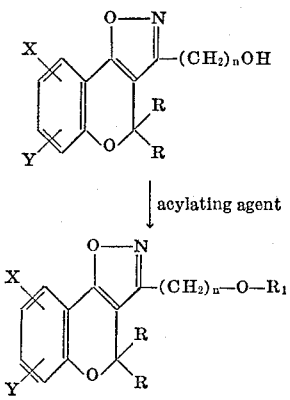

in which $R_1$ is acyl and R, X and Y are as previously defined and represent groups which do not partake in or interfere with the reaction.

Representative of the compounds which may be prepared by the described process are the following:

4H[1]benzopyrano[3,4-d]isoxazole-3-methanol acetate,
4H[1]benzopyrano[3,4-d]isoxazole-3-methanol trifluoroacetate,
8-chloro-4H[1]benzopyrano[3,4-d]isoxazole-3,4,5, trimethoxybenzoate, and
4-methyl-7-methoxy-4H[1]benzopyrano[3,4-d]isoxazole-3-nicotinate.

In the preferred practice the carbamates are prepared by first treating the corresponding 4H[1]benzopyrano[3,4-d]isoxazole-3-lower alkanol such as the 3-methanol and 3-ethanol derivatives dissolved in an inert solvent such as dry benzene, with phosgene (10% in benzene) in the presence of an acid acceptor such as dimethylaniline to form the corresponding chloroformate. The chloroformate is then treated with an appropriate amine or ammonia to form the desired carbamate.

The process may be illustrated as follows:

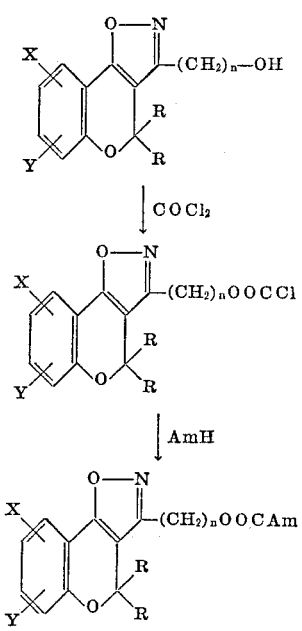

in which R, X and Y are as previously defined and represent groups which do not interfere with or partake in the reaction.

Representative of the amines that can be employed in the above reaction are the following:

Ethanolamine,
Methylamine,
Isopropylamine,
Benzylamine,
Cyclohexylamine,
Pyridine, and
4-methylpiperazine Representative of the compounds which may be prepared by the described processes are the following:

8-chloro-4H[1]benzopyrano[3,4-d]isoxazolyl-3-methyl methylcarbamate,
4H[1]benzopyrano[3,4-d]isoxazolyl-3-methyl methylcarbamate,
8-chloro-4H[1]benzopyrano[3,4-d]isoxazolyl-3-methyl 2-hydroxyethylcarbamate,
4H[1]benzopyrano[3,4-d]isoxazolyl-3-methyl 2-hydroxyethylcarbamate,
8-chloro-4H[1]benzopyrano[3,4-d]isoxazolyl-3-methyl isopropylcarbamate,
4H[1]benzopyrano[3,4-d]isoxazolyl-3-methyl isopropylcarbamate,
8-chloro-4H[1]benzopyrano[3,4-d]isoxazolyl-3-methyl benzylcarbamate,
4H[1]benzopyrano[3,4-d]isoxazolyl-3-methyl benzylcarbamate,
8-chloro-4H[1]benzopyrano[3,4-d]isoxazolyl-3-methyl 3-pyridylcarbamate,
4H[1]benzopyrano[3,4-d]isoxazolyl-3-methyl 3-pyridylcarbamate,
8-chloro-4H[1]benzopyrano[3,4-d]isoxazolyl-3-methyl-4-methylpiperazino-1-carboxylate, and
4H[1]benzopyrano[3,4-d]isoxazolyl-3-methyl 4-methylpiperazino-1-carboxylate Acid addition salts of the compounds of the present invention capable of forming such salts may be conveniently produced by contacting the compounds with a suitable acid such as formic acid, citric acid, maleic acid, sulfuric acid, hydrochloric acid, succinic acid, tartaric acid, benzoic acid or fumaric acid.

Quaternary ammonium salts may be formed by contacting the compounds capable of forming such salts with a suitable alkylating agent such as dimethyl sulfate, or an alkyl halide such as methyl chloride, methyl iodide or ethyl bromide.

The thiocyanic acid addition salts of the carbamates of this invention, when condensed with formaldehyde, form resinous materials useful as pickling inhibitors according to U.S. Pats. 2,425,320 and 2,606,155. The compounds also form fluosilicic acid addition salts which are useful as moth proofing or wood preserving agents according to U.S. Pats. 1,915,334 and 2,075,359.

The compounds also form salts with penicillins. These salts have solubility characteristics which cause them to be useful in the purification and isolation of penicillins, particularly benzyl penicillin.

The novel compounds of the present invention and their pharmaceutically acceptable salts also have utility as muscle relaxants and antidepressant agents. In addition, these compounds are useful as intermediates in the preparation of more complex pharmaceutical compounds.

In mouse behavioral studies the compounds

4H[1]benzopyrano[3,4-d]isoxazole-3-methanol carbamate,
8-chloro-4H[1]benzopyrano[3,4-d]isoxazolyl-3-methyl carbamate,
8-chloro-4H[1]benzopyrano[3,4-d]isoxazolyl-3-methyl cyclohexylcarbamate and
8-chloro-4H[1]benzopyrano[3,4-d]isoxazolyl-3-methyl benzylcarbamate were found in doses of approximately 100 mg./kg. to stimulate touch response irritability, vocalization and startle response indicating central nervous system stimulation. The behavioral study was conducted essentially in accordance with the procedure outlined by Irwin in "Animal and Clinical Pharmacologic Techniques in Drug Evaluation," Year Book Medical Publishers, Inc., Chicago, Ill. (1964). The approximate $LD_{50}$ values obtained intraperitoneally in the behavioral studies were all found to be in excess of 200 mg./kg.

When intended for pharmaceutical use, the compounds are preferably combined with one or more suitable pharmaceutical diluents and additives and formed into unit dosage forms for oral or parenteral administration such as tablets, capsules and solutions.

The pharmaceutical diluents which may be employed may be either solids such as starch, talc or sugar, or liquids such as water or propylene glycol.

The unit dosage forms may contain a concentration of 0.1% to 10% or more by weight of one or more of the novel compounds. Generally, such dosage forms will contain about 5 to 150 mg. of the active ingredients.

The following examples are presented to illustrate this invention:

EXAMPLE 1

Ethyl 4-oxochroman-3-glyoxylate

A mixture of 74 g. (0.5 mole) of 4-chromanone and 146 g. (1.0 mole) of ethyl oxalate in 375 ml. of anhydrous toluene is added dropwise over 1.25 hours to a suspension of sodium hydride (from 54.4 g. of a 53.3% oil-hydride mixture) in 1 liter of anhydrous toluene under an atomsphere of nitrogen. After stirring at room temperature overnight the reaction mixture is added to 1 kg. of ice and stirred 1 hour. The aqueous layer is separated and the organic phase extracted with five 250 ml. portion of $H_2O$. Acidification of the combined extracts with 75 ml. of concentrated hydrochloric acid gives a precipitate of 115.6 g. of a bright yellow solid. Recrystallizaiton from 200 ml. of ethanol yields ethyl 4-oxochroman-3-glyoxylate, M.P. 72–79°.

*Analysis.*—Calcd. for $C_{13}H_{12}O_5$ (percent): C, 62.90; H, 4.87. Found (percent): C, 62.68; H, 5.03.

EXAMPLE 2

Ethyl 4H[1]benzopyrano[3,4-d]isoxazole-3-carboxylate

A mixture of 99.2 g. (0.4 mole) of ethyl 4-oxochroman-3-glyoxylate, 29.6 g. (0.425 mole) of hydroxylaminehydrochloride and 800 ml. of ethanol is refluxed for 18 hours, 200 ml. of solvent distilled and the residue cooled to give 83.9 g. of the isoxazole, M.P. 88–92°. Recrystallization from cyclohexane provides the pure ester, ethyl 4H[1]benzopyrano[3,4-d]isoxazole-3-carboxylate, M.P. 90–92°.

*Analysis.*—Calcd. for $C_{13}H_{11}NO_4$ (percent): C, 63.68; H, 4.53; N, 5.71. Found (percent): C, 63.92; H, 4.67; N, 5.56.

EXAMPLE 3

4H[1]benzopyrano[3,4-d]isoxazole-3-methanol

A solution of 14.9 g. (0.061 mole) of ethyl 4H[1]benzopyrano[3,4-d]isoxazole-3-carboxylate in a mixture of 250 ml. of dry ether and 25 ml. of benzene is added to a suspension of 1.9 g. (0.05 mole) of $LiAlH_4$ in 250 ml. of dry ether while cooling in an ice bath. After stirring 6 hours at room temperature, the mixture is cooled in ice, treated with 100 ml. of 3 N HCl and stirred overnight at room temperature. The ether layer is separated, dried over $CaCl_2$ and the solvent removed. Recrystallization of the solid residue from carbon tetrachloride-cyclohexane gives 4H[1]benzopyrano[3,4-d]isoxazole - 3 - methanol, M.P. 107–108.5°.

*Analysis.*—Calcd. for $C_{11}H_9NO_3$ (percent): C, 65.02; H, 4.47; N, 6.89. Found (percent): C, 65.31; H, 4.51; N, 7.21.

EXAMPLE 4

(A)

4H[1]benzopyrano[3,4-d]isoxazole - 3 - methanol carbamate and 4H[1]benzopyrano[3,4-d]isoxazole-3-methanol trifluoroacetate A mixture of 4.06 g. (0.02 mole) of 4H[1]benzopyrano[3,4-d]isoxazole - 3 - methanol, 2.60 g. (0.04 mole) of NaCNO and 20 ml. of $CH_2Cl$ is magnetically stirred while 3.2 ml. (0.043 mole) of trifluoroacetic acid is added dropwise. A heavy precipitate forms after addition of 1.0 ml. of trifluoro acetic acid and an additional 30 ml. of $CH_2Cl_2$ is required to enable stirring. After addition of the remainder of the acid, the heavy precipitate gradually disappears leaving a small amount of a granular solid. After 20 minutes, a heavy precipitate again forms but does not subsequently dissolve. After standing overnight, the precipitate is filtered and washed well with water. Recrystallization from isopropanol gives the desired product, M.P. 185–188°. Recrystallization from 100 ml. of isopropanol gives 4H[1]benzopyrano[3,4-d]isoxazole - 3 - methanol carbamate, M.P. 188–189°.

*Analysis.*—Calcd. for $C_{12}H_{10}N_2O_4$ (percent): C, 58.53; H, 4.10; N, 11.38. Found (percent): C, 58.83; H, 4.09; N, 11.18.

(B)

Evaporation of the above methylene chloride filtrate leaves a solid residue which is treated with 25 ml. of hot cyclohexane to give 0.7 g. of crude urethane, M.P. 137–170° as the insoluble portion. Evaporation of the cyclohexane yields the crude trifluoroacetate, M.P. 49–64°. Two recrystallizations from small amounts of petroleum ether gives an analytical sample of 4H[1]benzopyrano[3,4-d]isoxazole-3-methanol trifluoroacetate, M.P. 65.5–66.5°.

*Analysis.*—Calcd. for $C_{13}H_8F_3NO_4$ (percent): C, 52.18; H, 2.70; F, 19.05; N, 4.68. Found (percent): C, 51.79; H, 2.90; F, 19.77; H, 4.53.

EXAMPLE 5

8-chloro-4H[1]benzopyrano[3,4-d]isoxazolyl-3-methyl chloroformate

A stirred mixture of 10.0 g. (0.042 M) of 8-chloro-4H-[1]benzopyrano[3,4-d]isoxazole - 3 - methanol, 5.08 g. (0.042 M) of dimethylaniline and 400 ml. of dry benzene at 5° is treated with 50 g. of 10% phosgene in benzene after stirring at room temperature overnight, the mixture is washed with water, 1% HCl and water and dried over calcium chloride.

EXAMPLE 6

8-chloro-4H[1]benzopyrano[3,4-d]isoxazolyl-3-methyl carbamate

A solution of the above chloroformate (from 5.0 g., 0.021 M of alcohol) in benzene is treated with 2 equivalents of anhydrous ammonia. After stirring overnight the precipitate is collected, washed well with water and recrystallized from acetonitrile, M.P. 236–238°.

*Analysis.*—Calcd. for $C_{12}H_9ClN_2O_4$ (percent): C, 51.34; H, 3.24; Cl, 12.64; N, 9.98. Found (percent): C, 51.58; H, 3.24; Cl, 12.39; N, 9.90.

EXAMPLE 7

8-chloro-4H[1]benzopyrano[3,4-d]isoxazolyl-3-methyl-2-hydroxyethylcarbamate

A solution of the chloroformate (from 5.0 g., 0.021 M of alcohol) in benzene is treated with 2.56 g. (0.042 M) of ethanolamine and the mixture stirred for 16 hours at room temperature. Addition of dilute HCl leaves a solid material insoluble in both phases. Filtration and recrystallization from methanol gives the 8-chloro-4H[1]benzopyrano[3,4-d]isoxazolyl-3-methyl-2 - hydroxyethylcarbamate, M.P. 143–145°.

*Analysis.*—Calcd. for $C_{14}H_{13}ClN_2O_5$ (percent): C, 51.79; H, 4.03; Cl, 10.92; N, 8.63. Found (percent): C, 52.01; H, 4.23; Cl, 10.90; N, 8.65.

In a similar manner the following compounds may be prepared:

(a) 8-chloro-4H[1]benzopyrano[3,4 - d]isoxazolyl - 3-methyl methylcarbamate, M.P. 149–151° from ethanol.

*Analysis.*—Calcd. for $C_{13}H_{11}ClN_2O_4$ (percent): C, 52.99; H, 3.76; Cl, 12.03. Found (percent): C, 53.13; N, 3.99; Cl, 11.92.

(b) 8 - chloro-4H[1]benzopyrano[3,4-d]isoxazolyl-3-methyl isopropylcarbamate, M.P. 137–138° from ethanol.

*Analysis.*—Calcd. for $C_{15}H_{15}ClN_2O_4$ (percent): C, 55.82; H, 4.68; Cl, 10.99. Found (percent): C, 55.64; H, 4.38; Cl, 10.75; N, 8.57.

(c) 8 - chloro - 4H[1]benzopyrano[3,4-d]isoxazolyl-3-methyl benzylcarbamate, M.P. 141–142° from ethanol.

*Analysis.*—Calcd. for $C_{19}H_{15}ClN_2O_4$ (percent): C, 61.54; H, 4.08; N, 7.55. Found (percent): C, 61.72; H, 3.89; N, 7.78.

(d) 8 - chloro - 4H[1]benzopyrano[3,4-d]isoxazolyl-3-methyl cyclohexylcarbamate, M.P. 190–191° from acetonitrile.

*Analysis.*—Calcd. for $C_{18}H_{19}ClN_2O_4$ (percent): C, 59.58; H, 5.28; Cl, 9.77; N, 7.72. Found (percent): C, 59.76; H, 5.37; Cl, 9.50; N, 7.69.

(e) 8 - chloro - 4H[1]benzopyrano[3,4-d]isoxazolyl-3-methyl-3-pyridylcarbamate, M.P. 188–189° from methanol.

*Analysis.*—Calcd. for $C_{17}H_{12}ClN_3O_4$ (percent): C, 57.06; H, 3.38; Cl, 9.91; N, 11.75. Found (percent): C, 57.03; H, 3.49; Cl, 9.70; N, 11.59.

(f) 8 - chloro - 4H[1]benzopyrano[3,4-d]isoxazolyl-3-methyl - 4-methylpiperazine-1-carboxylate hydrochloride, 253–255° from water.

*Analysis.*—Calcd. for $C_{17}H_{19}Cl_2N_3O_4$ (percent): C, 51.00; H, 4.79; Cl, 17.72; N, 10.50. Found (percent): C, 51.14; H, 4.96; Cl, 17.61; N, 10.42.

EXAMPLE 8

8-chloro-4H[1]benzopyrano[3,4-d]isoxazolyl-3-methyl phenylcarbamate

A mixture of 5.0 g. (0.021 M) of 8-chloro-4H[1]benzopyrano[3,4-d]isoxazole-3-methanol, 2.8 g. (0.023 M) of phenylisocyanate and 100 ml. of anhydrous benzene is refluxed overnight. Water (50 ml.) is added whereupon solids insoluble in both phases form. The solids are filtered and recrystallized from acetonitrile to yield 8-chloro-4H[1]benzopyrano[3,4-d]isoxazolyl - 3 - methyl phenylcarbamate, M.P. 189–190° C.

*Analysis.*—Calcd. for $C_{18}H_{13}ClN_2O_4$ (percent): C, 60.58; H, 3.67; Cl, 9.94; N, 7.85. Found (percent): C, 60.58; H, 3.77; Cl, 9.75; N, 8.29.

EXAMPLE 9

8-chloro-4H[1]benzopyrano[3,4-d]isoxazolyl-3-methyl dimethylcarbamate

A mixture of 5.0 g. (0.021 M) of 8-chloro-4H[1]benzopyrano[3,4-d]isoxazolyl-methanol, 0.85 g. (0.021 M) of sodium hydride (as a 59% dispersion in oil) and 100 ml. of dry benzene is stirred for one hour and treated with a solution of 2.50 g. (0.021 M) of dimethylcarbamyl chloride in 50 ml. of benzene. After stirring at 70° overnight, the mixture is extracted with two 50 ml. portions of water and the organic phase dried over potassium carbonate. Removal of the solvent leaves solids which are recrystallized from methanol to yield 8-chloro-4H[1]benzopyrano[3,4-d]isoxazolyl-3-methyl dimethylcarbamate, M.P. 131–132°.

*Analysis.*—Calcd. for $C_{14}H_{13}ClN_2O_4$ (percent): C, 54.46; H, 4.24; Cl, 11.48; N, 90.08. Found (percent): C, 54.60; H, 4.32; Cl, 11.62; N, 9.10.

EXAMPLE 10

8-chloro-4H-[1]benzopyrano[3,4-d]isoxazole-3-carboxylate

When potassium 8-chloro-4H-[1]benzopyrano[3,4-d]isoxazole-3-carboxylate is stirred with dilute HCl a substance, M.P. 205°, dec. is obtained. A portion is insoluble in hot DMF while the remainder dissolves to give a yellow solution. The solid which is reisolated from the DMF by dilution with water is yellow and melts at 298–302°. When the salt (1.0 g.) is stirred with 20 ml. of trifluoroacetic acid on a steam bath, 8-chloro-4H-[1]benzopyrano[3,4-d]isoxazole-3-carboxylate, M.P. 190–192° dec. is obtained.

EXAMPLE 11

8-chloro-4H-[1]benzopyrano[3,4-d]isoxazole-3-methanol

A solution of 56.0 g. (0.2 mole) of 8-chloro-4H-[1]benzopyrano[3,4-d]isoxazole-3-carboxylate in 340 ml. of benzene is added dropwise to a stirred mixture of 6.25 g. (0.164 mole) of LiAlH$_4$ in 1000 ml. of dry ether (from LiAlH$_4$) while cooling in an ice bath. After stirring overnight and allowing the ice to melt, the mixture is again cooled and treated dropwise with 330 ml. of 3 N HCl. The mixture is stirred overnight and the solids insoluble in both layers filtered. The ether layer is separated, washed with water and dried over K$_2$CO$_3$. The ether is removed and the residue recrystallized from methanol to give 8-chloro-4H-[1]benzopyrano[3,4-d]isoxazole-3-methanol, M.P. 158–160°.

I claim:
1. A compound of the formula

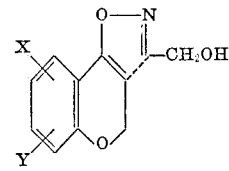

in which X and Y are hydrogen, halo, alkyl of 1 to 4 carbons, alkoxy of 1 to 4 carbon atoms or trifluoromethyl.
2. A compound of claim 1 in which X and Y are hydrogen or halogen.
3. A compound of claim 1 in which X is hydrogen and Y is chloro.
4. The compound of claim 1 which is 4H-[1]benzopyrano[3,4-d]isoxazole-3-methanol.
5. The compound of claim 1 which is 8-chloro-4H[1]-benzopyrano[3,4-d]isoxazole-3-methanol.

References Cited
UNITED STATES PATENTS
3,553,229   1/1971   Freedman _____ 260—307

NICHOLAS S. RIZZO, Primary Examiner

R. V. RUSH, Assistant Examiner

U.S. Cl. X.R.

252—403; 260—239.1, 293.58, 295 T, 345.2; 424—248, 250, 263, 267